United States Patent
Kim et al.

(10) Patent No.: US 9,456,142 B2
(45) Date of Patent: Sep. 27, 2016

(54) METHOD FOR PROCESSING IMAGE AND ELECTRONIC DEVICE THEREOF

(71) Applicant: Samsung Electronics Co., Ltd., Gyeonggi-do (KR)

(72) Inventors: Young-Kyoo Kim, Seoul (KR); Ki-Huk Lee, Gyeonggi-do (KR); Hong-Seok Yang, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 3 days.

(21) Appl. No.: 14/295,772

(22) Filed: Jun. 4, 2014

(65) Prior Publication Data
US 2014/0355962 A1    Dec. 4, 2014

(30) Foreign Application Priority Data
Jun. 4, 2013  (KR) .................. 10-2013-0064107

(51) Int. Cl.
| | | |
|---|---|---|
| H04N 5/77 | (2006.01) | |
| H04N 5/93 | (2006.01) | |
| G11B 27/00 | (2006.01) | |
| H04N 5/232 | (2006.01) | |
| H04N 1/387 | (2006.01) | |
| H04N 1/56 | (2006.01) | |
| G06T 11/60 | (2006.01) | |
| H04N 5/225 | (2006.01) | |
| H04N 5/262 | (2006.01) | |
| G06F 3/0488 | (2013.01) | |
| G06F 3/0484 | (2013.01) | |

(52) U.S. Cl.
CPC ........ *H04N 5/23293* (2013.01); *G06F 3/0488* (2013.01); *G06F 3/04847* (2013.01); *G06T 11/60* (2013.01); *H04N 1/3871* (2013.01); *H04N 1/56* (2013.01); *H04N 5/2258* (2013.01); *H04N 5/23216* (2013.01); *H04N 5/2621* (2013.01)

(58) Field of Classification Search
USPC .................................... 386/223–227
See application file for complete search history.

(56) References Cited

U.S. PATENT DOCUMENTS

| | | | |
|---|---|---|---|
| 8,380,005 B1* | 2/2013 | Jonsson ................. | 382/282 |
| 2009/0310010 A1* | 12/2009 | Matsushima et al. ... | 348/333.01 |
| 2010/0220197 A1* | 9/2010 | Dukellis et al. .......... | 348/207.1 |
| 2010/0321534 A1* | 12/2010 | Kim ........................ | 348/239 |
| 2011/0242261 A1* | 10/2011 | Kuwahara et al. ...... | 348/231.4 |
| 2011/0249073 A1* | 10/2011 | Cranfill et al. ........... | 348/14.02 |
| 2012/0092435 A1 | 4/2012 | Wohlert | |
| 2012/0162459 A1* | 6/2012 | Cheng ...................... | 348/222.1 |
| 2012/0274808 A1* | 11/2012 | Chong et al. ............ | 348/234 |
| 2013/0139107 A1* | 5/2013 | Jung ......................... | 715/810 |
| 2013/0141605 A1* | 6/2013 | Kim et al. ............... | 348/222.1 |
| 2013/0235071 A1* | 9/2013 | Ubillos et al. .......... | 345/600 |
| 2013/0283144 A1* | 10/2013 | Roh et al. ............... | 715/230 |
| 2015/0062052 A1* | 3/2015 | Bernstein et al. ....... | 345/173 |

* cited by examiner

*Primary Examiner* — Nigar Chowdhury
(74) *Attorney, Agent, or Firm* — The Farrell Law Firm, P.C.

(57) ABSTRACT

An apparatus and method for processing an image in an electronic device are provided. The method includes displaying on a display module a plurality of images acquired through a plurality of image sensors, and applying an editing effect to at least one image among the plurality of images.

10 Claims, 22 Drawing Sheets

METHOD FOR PROCESSING IMAGE AND ELECTRONIC DEVICE THEREOF

PRIORITY

This application claims priority under 35 U.S.C. §119(a) to a Korean Patent Application filed in the Korean Intellectual Property Office on Jun. 4, 2013 and assigned Serial No. 10-2013-0064107, the entire contents of which are incorporated herein by reference.

BACKGROUND

1. Field of the Invention

The present invention generally relates to a method for processing an image and an electronic device thereof.

2. Description of the Related Art

With the growth of Information Telecommunication (IT) technologies and semiconductor technologies, a variety of electronic devices have become multimedia devices providing various multimedia services. For example, a portable electronic device can provide various multimedia services such as a broadcasting service, a wireless Internet service, a camera service, a music service, and the like.

An electronic device can provide various services using an image acquired through an image sensor. An electronic device can include a plurality of image sensors in a front part of the electronic device and a rear part thereof. For example, the electronic device can acquire an image using a 1st image sensor of the front part and/or a 2nd image sensor of the rear part. A user of the electronic device may need various services which use the 1st image sensor and the 2nd image sensor together.

SUMMARY

The present invention has been made to solve at least the above problems and/or disadvantages and to provide at least the advantages below. Accordingly, an aspect of the present invention is to provide an electronic device that can provide an apparatus and method for displaying on a display module images which are taken using a plurality of image sensors.

Another aspect of the present invention is to provide an apparatus and method for discriminately giving an editing effect to a plurality of images which are displayed on a display module in an electronic device.

Another aspect of the present invention is to provide an apparatus and method for discriminately giving an editing effect to a plurality of images which are acquired (or taken) using a plurality of image sensors in an electronic device.

Another aspect of the present invention is to provide an apparatus and method for highlighting a specific image among a plurality of images which are acquired using a plurality of image sensors in an electronic device.

Another aspect of the present invention is to provide an apparatus and method for giving an editing effect to at least one image among a plurality of images which are displayed on a display module in an electronic device.

Another aspect of the present invention is to provide an apparatus and method for giving an editing effect to at least one image among a plurality of images which are acquired using a plurality of image sensors in an electronic device.

In accordance with an aspect of the present invention, a method for processing an image in an electronic device is provided. The method includes displaying on a display module a plurality of images acquired through a plurality of image sensors, and applying an editing effect to at least one image among the plurality of images.

In accordance with another aspect of the present invention, an electronic device is provided. The electronic device includes a plurality of image sensors, a display module, and a processor configured to display on the display module a plurality of images acquired through the plurality of image sensors, and to apply an editing effect to at least one image among the plurality of images.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Embodiments of the present invention will be described herein below with reference to the accompanying drawings.

In the following description, well-known functions or constructions are not described in detail since they would obscure the invention in unnecessary detail. Terms described below, which are defined considering functions in the present invention, can be modified in accordance with a user and an operator's intention or practice. Therefore, the terms should be defined on the basis of the invention throughout this specification.

Various embodiments of the present invention describe a technology for discriminately giving an editing effect to a plurality of images in an electronic device.

In the following description, the electronic device can be a device such as a portable electronic device including a plurality of image sensors, a portable terminal, a mobile terminal, a mobile communication terminal, a mobile pad, a media player, a Personal Digital Assistant (PDA), a desktop computer, a laptop computer, a smartphone, a netbook, a television, a Mobile Internet Device (MID), an Ultra Mobile Personal Computer (UMPC), a tablet PC, a navigator, a smart Television (TV), a wrist watch, a digital camera, a Moving Picture Experts Group (MPEG) audio layer 3 (MP3) player, and the like. Also, the electronic device may be any electronic device combining functions of two or more devices among the aforementioned devices. In the following description, the image sensor is called a camera module.

Figure 1:
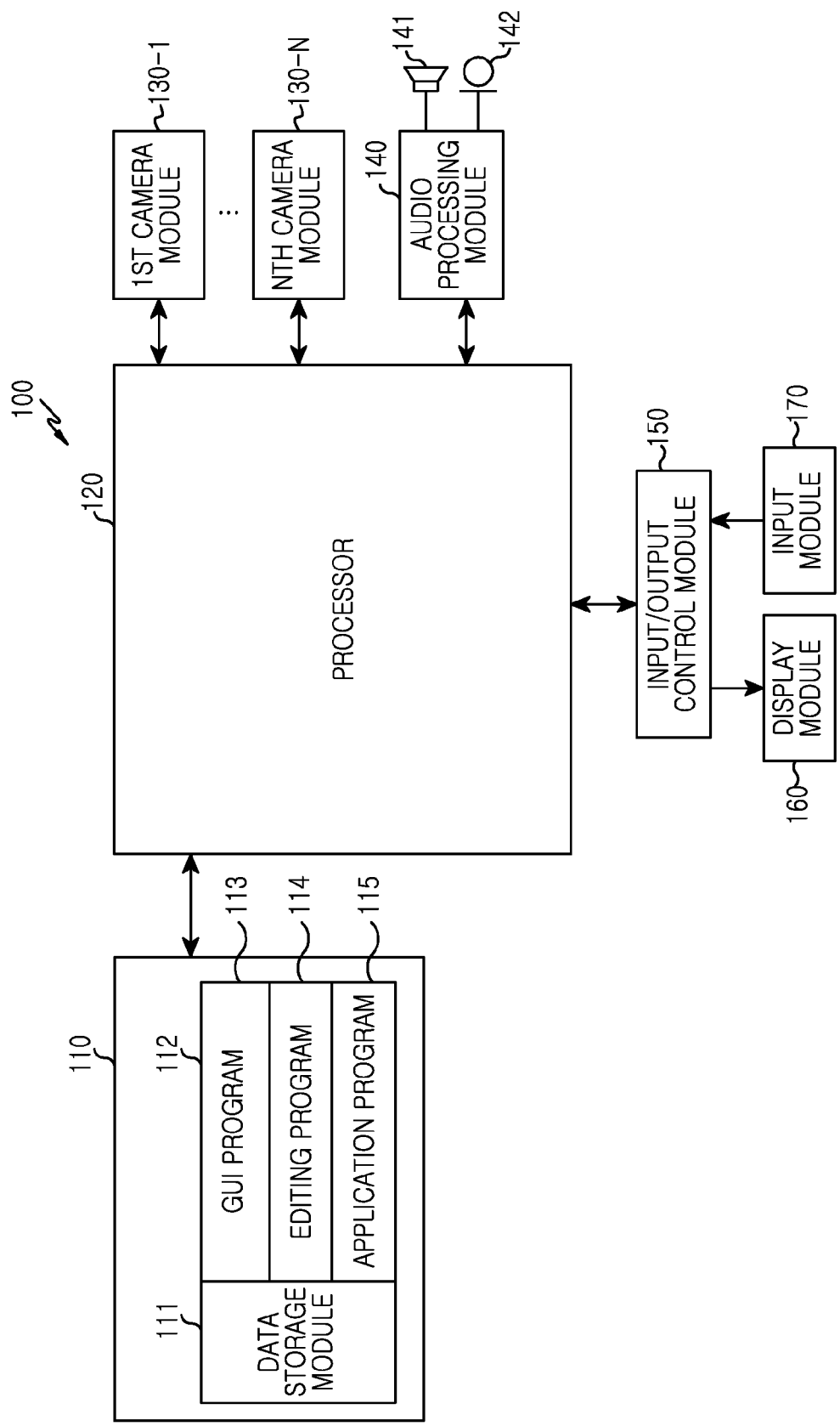
FIG. 1 is a block diagram illustrating a configuration of an electronic device in accordance with an embodiment of the present invention.

FIG. 1 illustrates a configuration of an electronic device in accordance with an embodiment of the present invention.

As illustrated in FIG. 1, the electronic device 100 includes a memory 110, a processor 120, camera modules 130-1 to 130-N, an audio processing module 140, an input/output control module 150, a display module 160, and an input module 170. Here, a plurality of memories 110 may exist.

The memory 110 includes a data storage module 111 storing data generated by driving of the electronic device 100 and a program storage module 112 storing one or more programs for controlling the operation of the electronic device 100.

The data storage module 111 includes an editing control table including editing effect information corresponding to input information provided through the input module 170.

The program storage module 112 includes a Graphical User Interface (GUI) program 113, an editing program 114, and at least one application program 115. Here, the program included in the program storage module 112, a set of instructions, may be expressed as an instruction set.

Figure 5A:
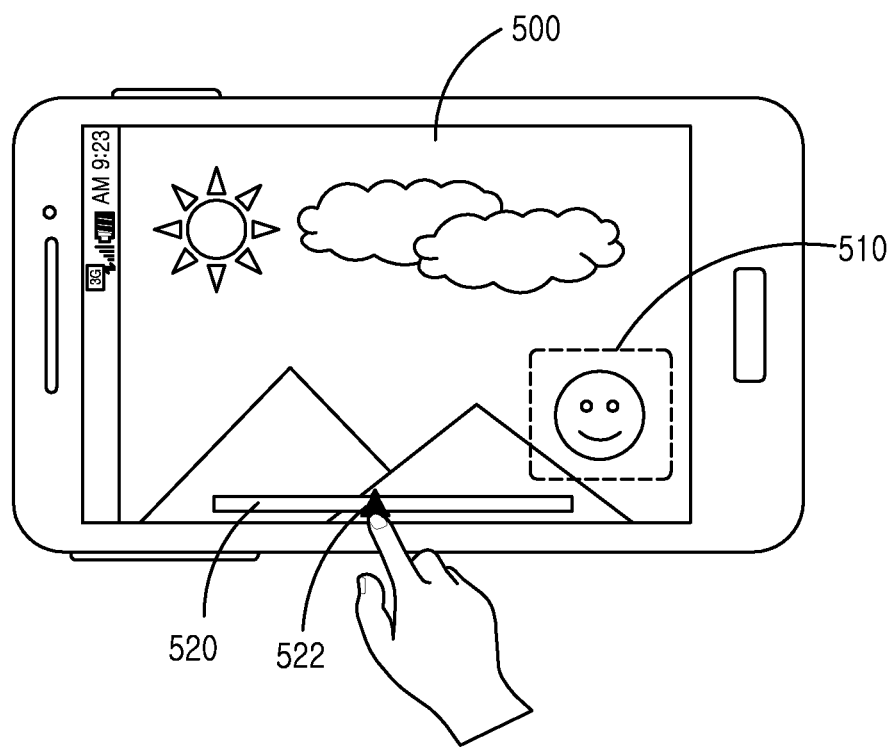
FIGS. 5A to 5C are diagrams illustrating screens for discriminately controlling a transparency for a plurality of images in accordance with the first embodiment of the present invention.

The GUI program 113 includes at least one software constituent element for providing a graphical user interface to the display module 160. The GUI program 113 controls to display on the display module 160 information of an application program driven by the processor 120. For example, the GUI program 113 controls to display on the display module 160 one or more images acquired through the cameras 130-1 to 130-N. In detail, when a 1st camera module 130-1 is included in a rear part of the electronic device 100 and a 2nd camera module 130-2 is included in a front part thereof, as illustrated in FIG. 5A, the GUI program 113 controls to overlap a 1st image 500 acquired through the 1st camera module 130-1 and a 2nd image 510 acquired through the 2nd camera module 130-2 and display the overlapping result on the display module 160. That is, the GUI program 113 controls to display the 1st image 500 in a 1st region among a display region of the display module 160 and display the 2nd image 510 in a 2nd region. At this time, the GUI program 113 may control to change a location of the 2nd region in which the 2nd image 510 is displayed in accordance with input information provided from the input module 170. Here, the image overlapped and displayed on the display module 160 includes a preview image or a captured image.

The editing program 114 includes at least one software constituent element for editing images displayed on the display module 160. At this time, the editing program 114 extracts an editing variable corresponding to input information provided from the input module 170 from an editing control table stored in the data storage module 111 and discriminately gives an editing effect to the images displayed on the display module 160.

Figure 5B:
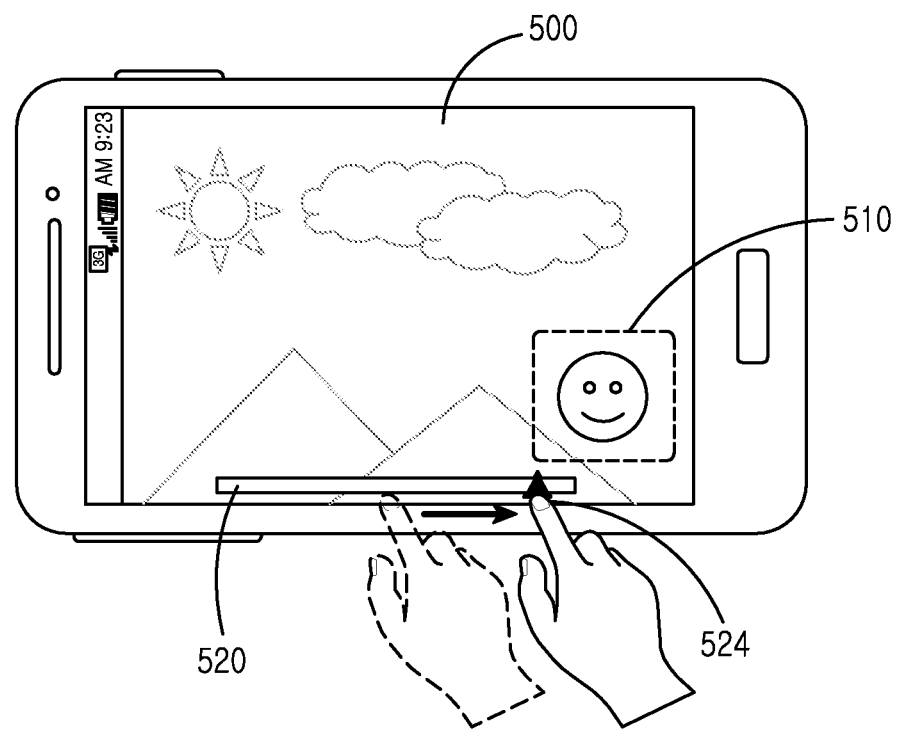
Figure 5C:
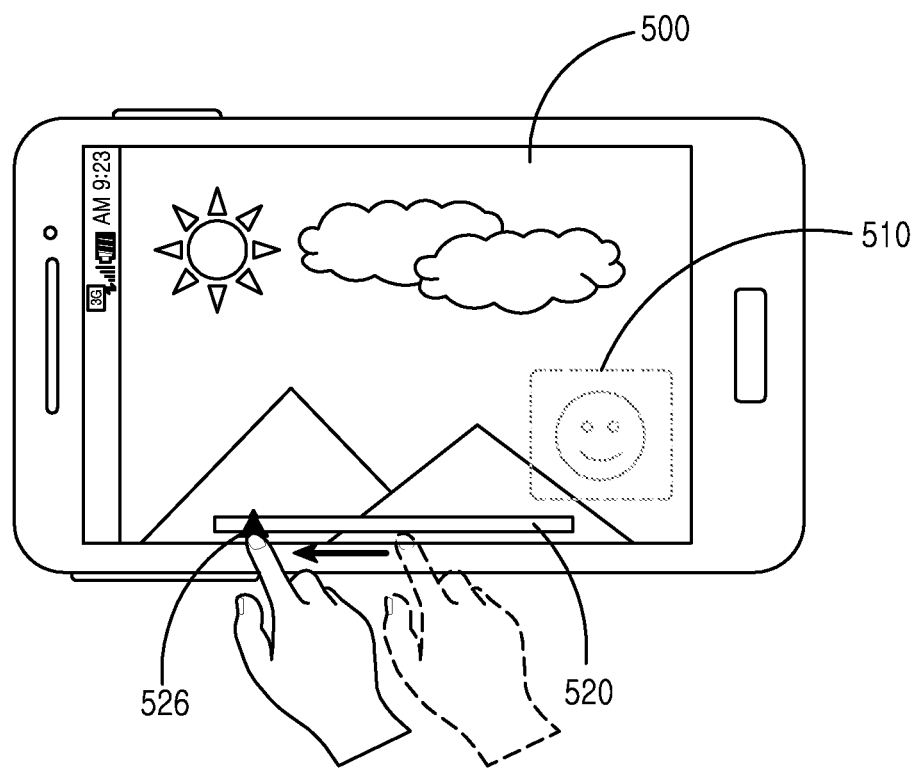

For example, as illustrated in FIGS. 5B and 5C, the editing program 114 adjusts a transparency for at least one image among images displayed on the display module 160 in accordance with input information provided from the input module 170.

Figure 12A:
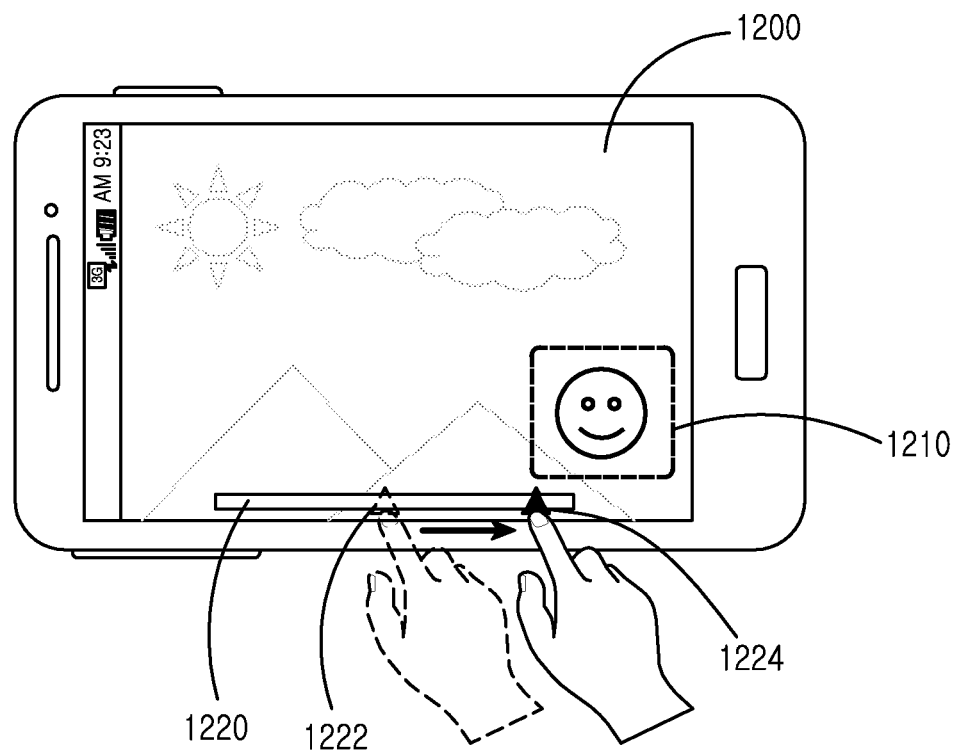
FIGS. 12A to 12B are diagrams illustrating screens for discriminately controlling a transparency for a plurality of images in accordance with the second embodiment of the present invention.
Figure 12B:
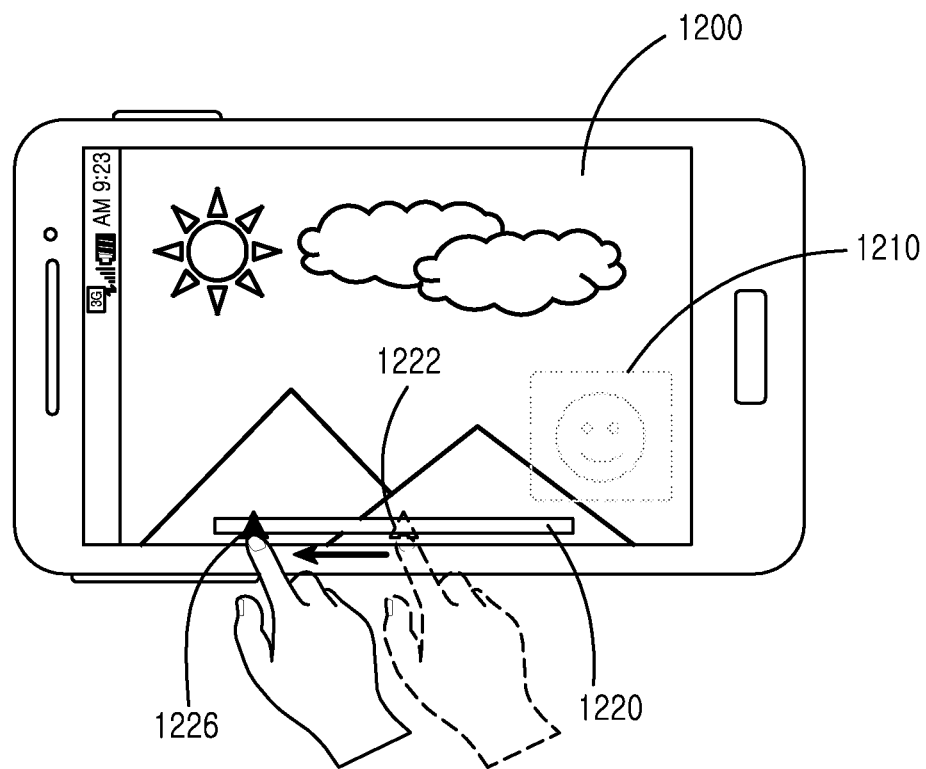

As another example, as illustrated in FIGS. 12A and 12B, the editing program 114 discriminately adjusts a transparency for images displayed on the display module 160 in accordance with input information provided from the input module 170. In detail, when increasing a transparency of a 1st image 1200 in accordance with input information provided from the input module 170 as illustrated in FIG. 12A, the editing program 114 decreases a transparency of a 2nd image 1210 in proportion to the adjustment amount of the transparency of the 1st image 1200. On the other hand, when increasing the transparency of the 2nd image 1210 in accordance with input information provided from the input module 170 as illustrated in FIG. 12B, the editing program 114 decreases the transparency of the 1st image 1200 in proportion to the adjustment amount of the transparency of the 2nd image 1210.

Figure 6A:
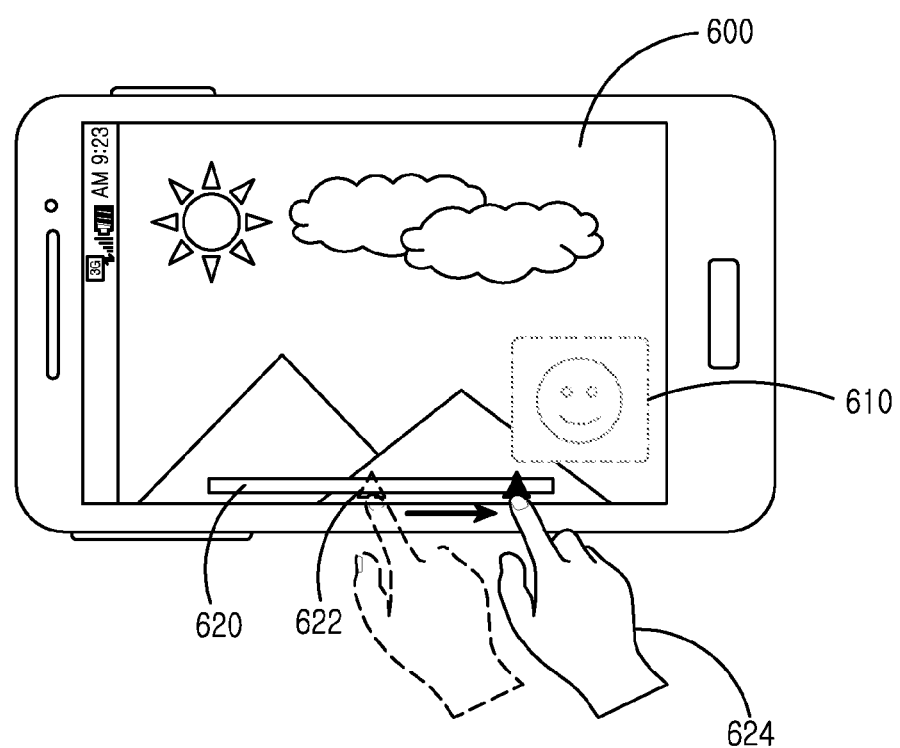
FIGS. 6A and 6B are diagrams illustrating screens for discriminately controlling a contrast for a plurality of images in accordance with the first embodiment of the present invention.
Figure 6B:
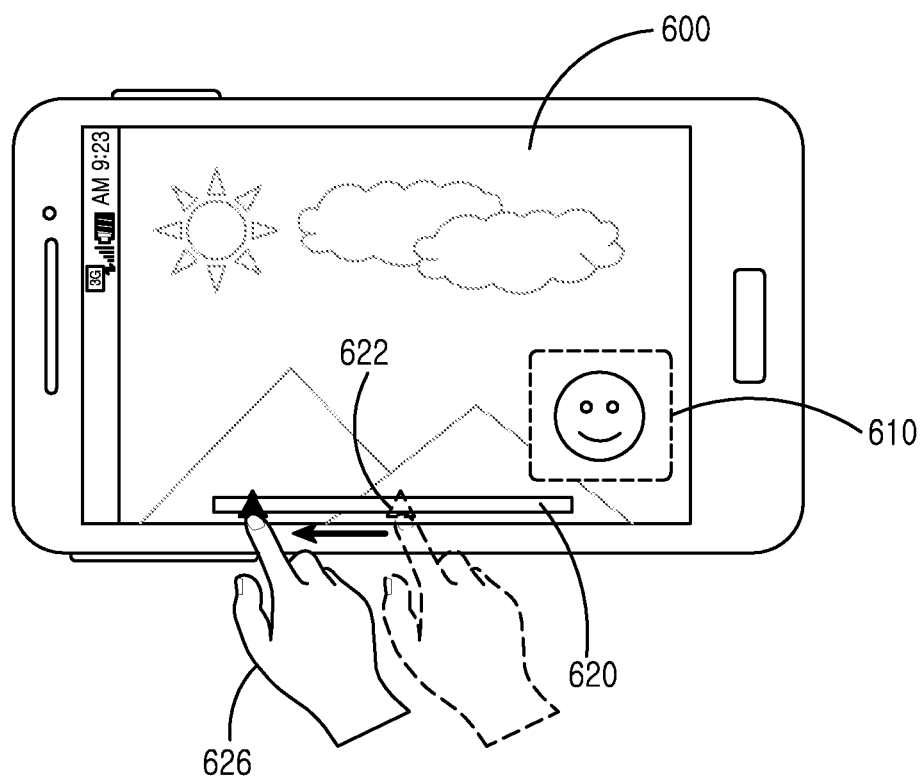

As yet another example, as illustrated in FIGS. 6A and 6B, the editing program 114 adjusts a contrast for at least one image among images displayed on the display module 160 in accordance with input information provided from the input module 170.

Figure 13A:
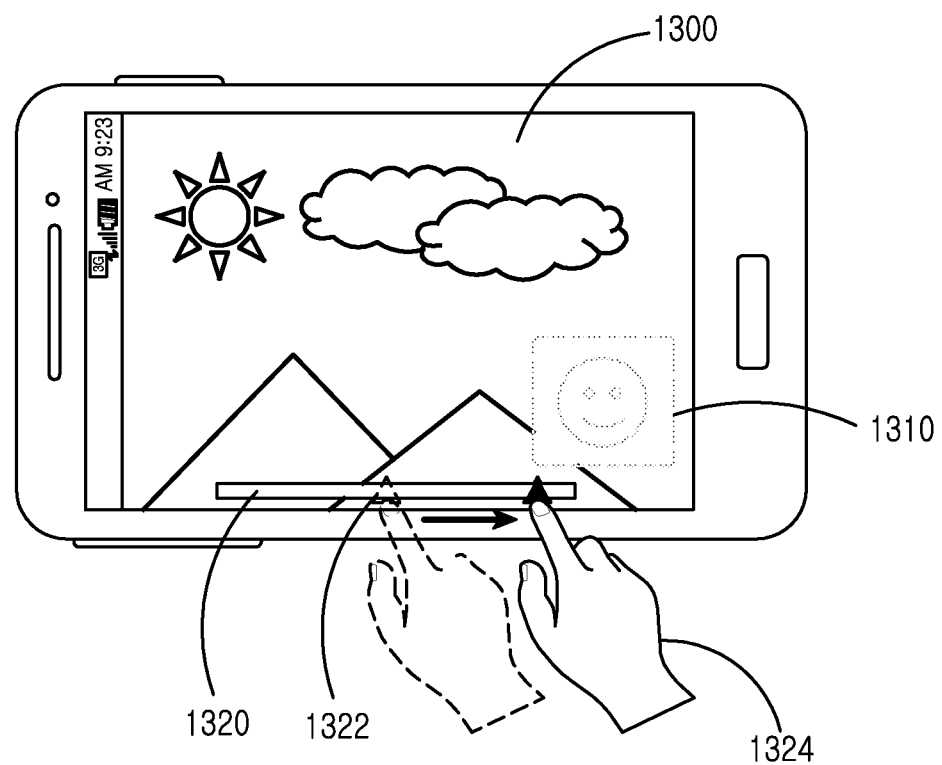
FIGS. 13A and 13B are diagrams illustrating screens for discriminately controlling a contrast for a plurality of images in accordance with the second embodiment of the present invention.
Figure 13B:
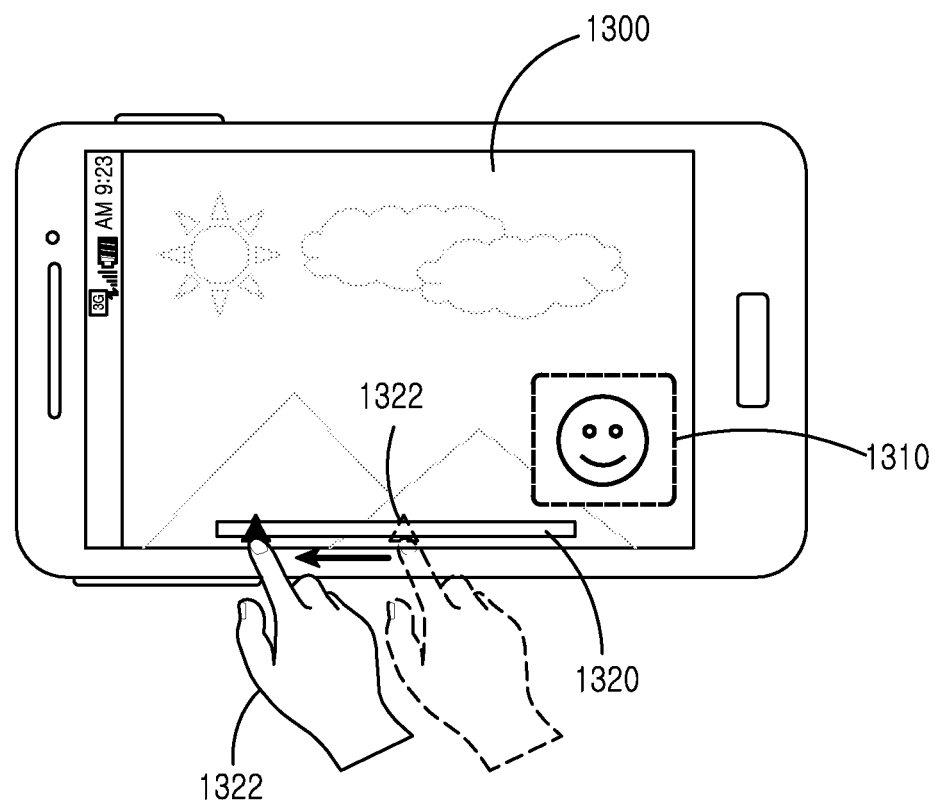

As yet another example, as illustrated in FIGS. 13A and 13B, the editing program 114 discriminately adjusts a contrast for images displayed on the display module 160 in accordance with input information provided from the input module 170. In detail, when increasing a contrast ratio of a 1st image 1300 in accordance with input information provided from the input module 170 as illustrated in FIG. 13A, the editing program 114 decreases a contrast ratio of a 2nd image 1310 in proportion to the adjustment amount of a contrast of the 1st image 1300. On the other hand, when increasing the contrast ratio of the 2nd image 1310 in accordance with input information provided from the input module 170 as illustrated in FIG. 13B, the editing program 114 decreases the contrast ratio of the 1st image 1300 in proportion to the adjustment amount of a contrast of the 2nd image 1310.

Figure 7A:
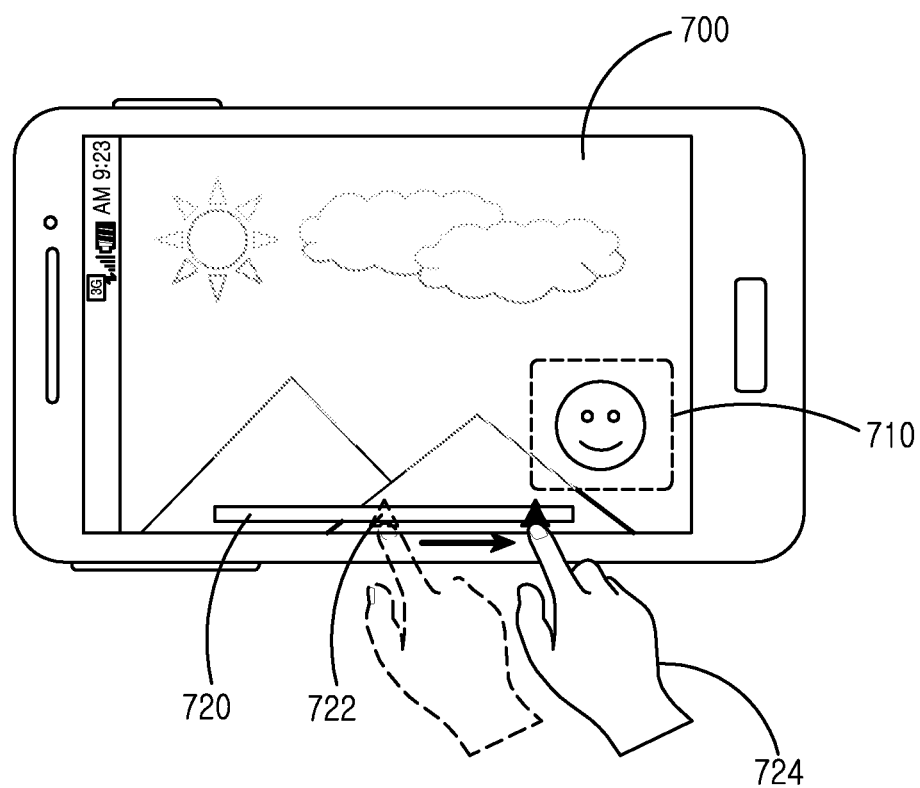
FIGS. 7A and 7B are diagrams illustrating screens for discriminately giving a gradient effect to a plurality of images in accordance with the first embodiment of the present invention.
Figure 7B:
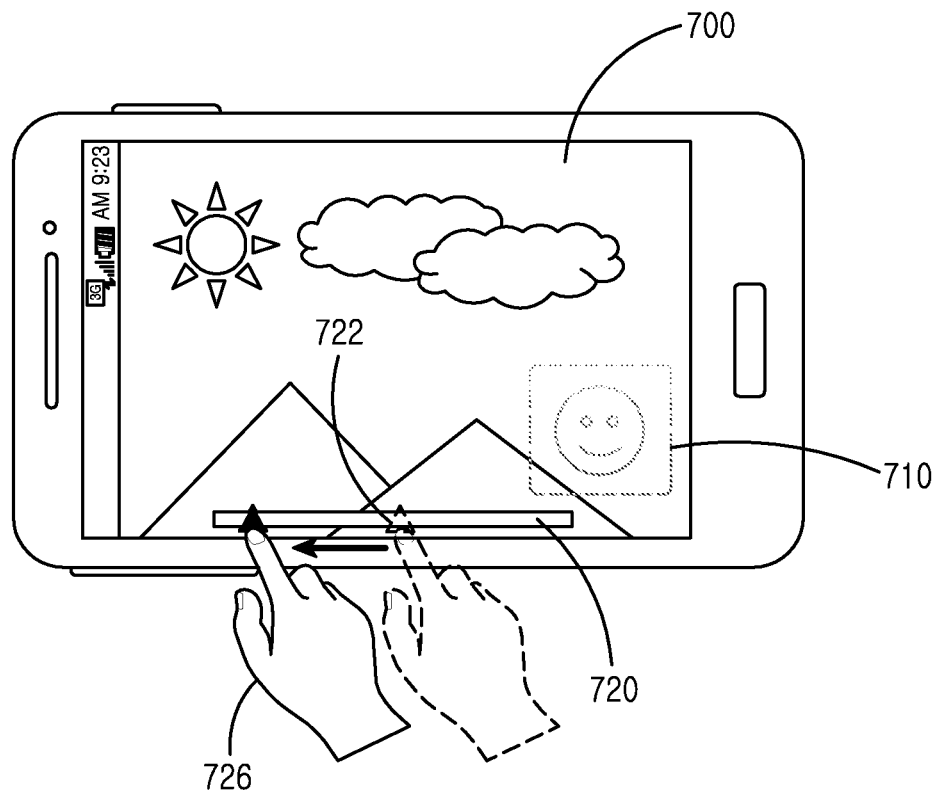

As yet another example, as illustrated in FIGS. 7A and 7B, the editing program 114 discriminately gives a gradient effect to at least one image among images displayed on the display module 160 in accordance with input information provided from the input module 170.

Figure 8A:
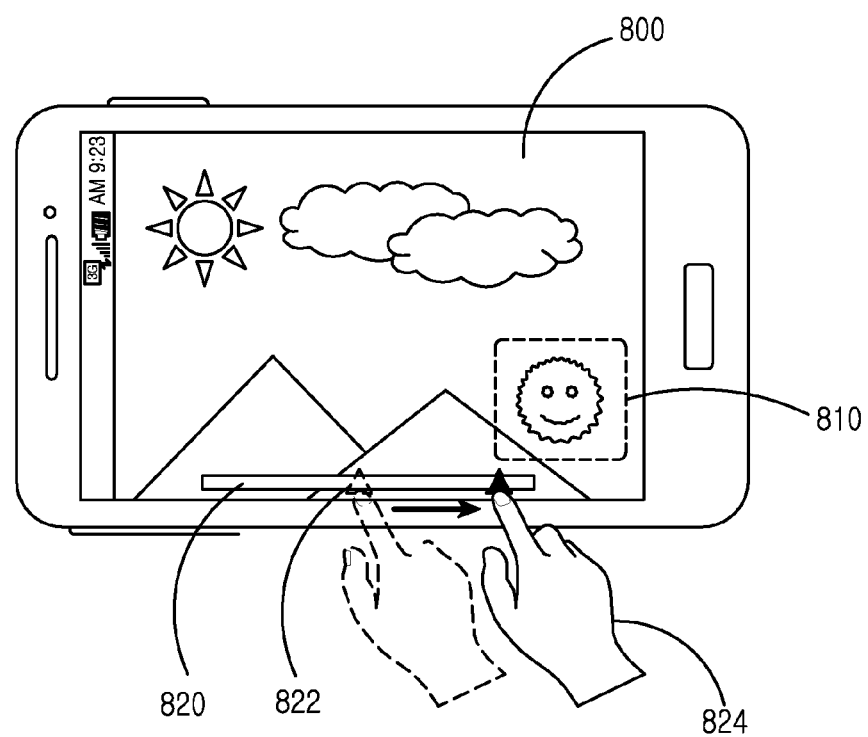
FIGS. 8A and 8B are diagrams illustrating screens for discriminately giving a distortion effect to a plurality of images in accordance with the first embodiment of the present invention.
Figure 8B:
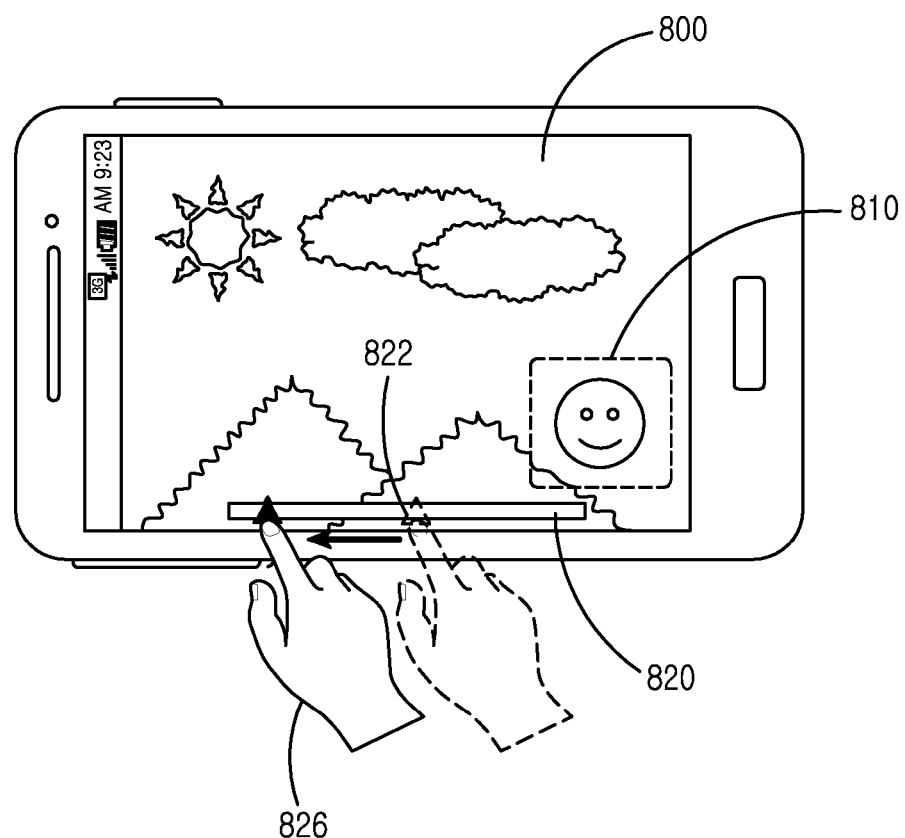

As yet another example, as illustrated in FIGS. 8A and 8B, the editing program 114 discriminately gives a distortion effect to at least one image among images displayed on the display module 160 in accordance with input information provided from the input module 170.

Figure 9A:
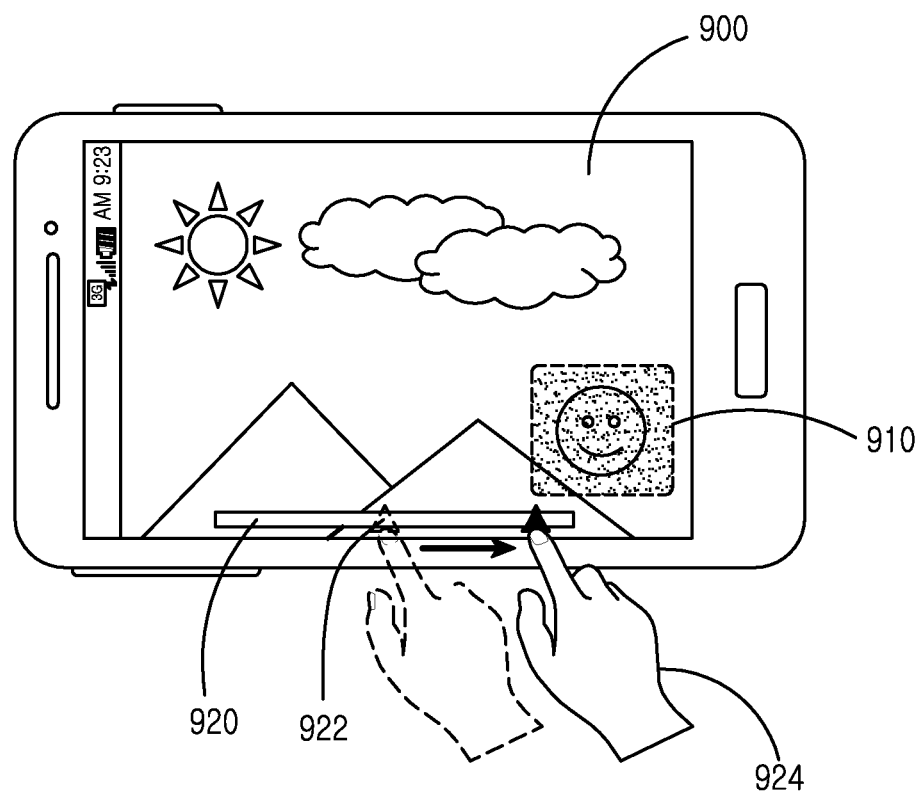
FIGS. 9A and 9B are diagrams illustrating screens for discriminately giving a charcoal effect to a plurality of images in accordance with the first embodiment of the present invention.
Figure 9B:
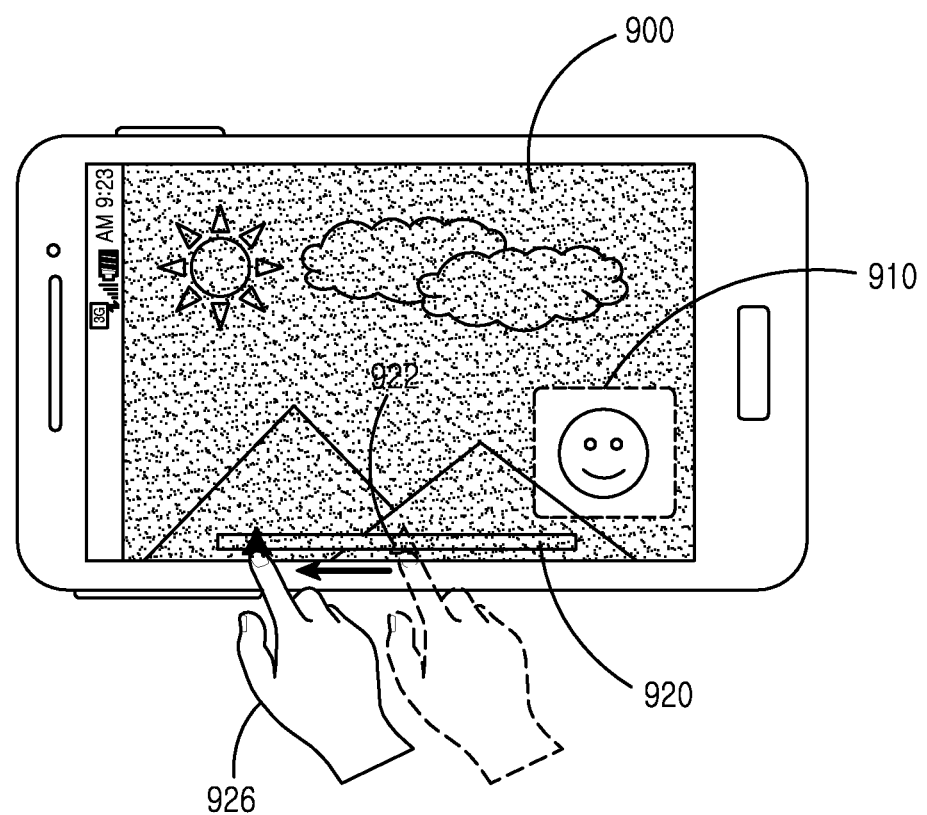

As yet another example, as illustrated in FIGS. 9A and 9B, the editing program 114 discriminately gives a charcoal effect to at least one image among images displayed on the display module 160 in accordance with input information provided from the input module 170.

The application program 115 includes a software constituent element for at least one application program installed in the electronic device 100.

The processor 120 controls the electronic device 100 to provide various multimedia services using at least one program. At this time, the processor 120 controls to execute at least one program stored in the memory 110 and provide a service corresponding to the corresponding program. For example, the processor 120 controls to execute the GUI program 113 stored in the program storage module 112 and display on the display module 160 one or more images acquired through the camera modules 130-1 to 130-N. In detail, when a 1st camera module 130-1 is included in a rear part of the electronic device 100 and a 2nd camera module 130-2 is included in a front part thereof, as illustrated in FIG. 5A, the processor 120 controls to overlap a 1st image 500 acquired through the 1st camera module 130-1 and a 2nd image 510 acquired through the 2nd camera module 130-2 and display the overlapping result on the display module 160.

The processor 120 executes the editing program 114 stored in the program storage module 112 and edits images displayed on the display module 160. At this time, the processor 120 extracts an editing variable corresponding to input information provided from the input module 170 from an editing control table stored in the data storage module 111 and discriminately gives an editing effect to the images displayed on the display module 160.

For example, as illustrated in FIGS. 5B and 5C, the processor 120 adjusts a transparency for at least one image among images displayed on the display module 160 in accordance with input information provided from the input module 170.

As another example, as illustrated in FIGS. 12A and 12B, the processor 120 discriminately adjusts a transparency for images displayed on the display module 160 in accordance with input information provided from the input module 170. In detail, when increasing a transparency of a 1st image 1200 in accordance with input information provided from the input module 170 as illustrated in FIG. 12A, the processor 120 decreases a transparency of a 2nd image 1210 in proportion to the adjustment amount of the transparency of the 1st image 1200. On the other hand, when increasing the transparency of the 2nd image 1210 in accordance with input information provided from the input module 170 as illustrated in FIG. 12B, the processor 120 decreases the transparency of the 1st image 1200 in proportion to the adjustment amount of the transparency of the 2nd image 1210.

As yet another example, as illustrated in FIGS. 6A and 6B, the processor 120 adjusts a contrast for at least one image among images displayed on the display module 160 in accordance with input information provided from the input module 170.

As yet another example, as illustrated in FIGS. 13A and 13B, the processor 120 discriminately adjusts a contrast for images displayed on the display module 160 in accordance with input information provided from the input module 170. In detail, when increasing a contrast ratio of a 1st image 1300 in accordance with input information provided from the input module 170 as illustrated in FIG. 13A, the processor 120 decreases a contrast ratio of a 2nd image 1310 in proportion to the adjustment amount of a contrast of the 1st image 1300. On the other hand, when increasing the contrast ratio of the 2nd image 1310 in accordance with input information provided from the input module 170 as illustrated in FIG. 13B, the processor 120 decreases the contrast ratio of the 1st image 1300 in proportion to the adjustment amount of a contrast of the 2nd image 1310.

As yet another example, as illustrated in FIGS. 7A and 7B, the processor 120 discriminately gives a gradient effect to at least one image among images displayed on the display module 160 in accordance with input information provided from the input module 170.

As yet another example, as illustrated in FIGS. 8A and 8B, the processor 120 discriminately gives a distortion effect to at least one image among images displayed on the display module 160 in accordance with input information provided from the input module 170.

As yet another example, as illustrated in FIGS. 9A and 9B, the processor 120 discriminately gives a charcoal effect to at least one image among images displayed on the display module 160 in accordance with input information provided from the input module 170.

The camera modules 130-1 to 130-N provide the processor 120 with collections of images that are acquired by photographing subjects. In detail, the camera modules 130-1 to 130-N each includes a camera sensor for converting an optical signal into an electrical signal and an Image Signal Processor (ISP) for converting an analog image signal into a digital image signal.

The audio processing module 140 provides an audio interface between a user and the electronic device 100 through a speaker 141 and a microphone 143.

The input/output control module 150 provides an interface between an input/output device, such as the display module 160, the input module 170 and the like, and the processor 120.

The display module 160 displays status information of the electronic device 100, a character inputted by a user, a moving picture, a still picture, and/or the like. For example, the display module 160 displays information of an application program driven by the processor 120. As another example, the display module 160 displays at least one preview image provided from the camera modules 130-1 to 130-N. In detail, as illustrated in FIG. 5A, the display module 160 overlaps and displays the 1st image 500 acquired through the 1st camera module 130-1 and the 2nd image 510 acquired through the 2nd camera module 130-2. At this time, the display module 160 logically or physically distinguishes a layer displaying the 1st image 500 and a layer displaying the 2nd image 510 and overlaps and displays the 1st image 500 and the 2nd image 510.

The input module 170 provides input data generated by user's selection, to the processor 120 through the input/output control module 150. Here, the input module 170 includes a keypad including at least one hardware button, a touch pad sensing touch information, a separate input device, and the like. For example, the input module 170 provides touch information of the touch pad generated by one or more of a touch pen, a finger, and a gloved finger, to the processor 120 through the input/output control module 150.

Though not illustrated, the electronic device 100 may further include a communication system performing a communication function for voice communication and data communication. Here, the communication system may be divided into a plurality of communication sub modules supporting different communication networks. For example, the communication network can include, although not limited to, a Global System for Mobile Communication (GSM) network, an Enhanced Data GSM Environment (EDGE)

network, a Code Division Multiple Access (CDMA) network, a Wideband-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC) and the like.

In the aforementioned embodiment of the present invention, the electronic device 100 includes the plurality of camera modules 130-1 to 130-N. At this time, one or more camera modules among the plurality of camera modules 130-1 to 130-N can be selectively connected to the electronic device 100. For example, one or more camera modules among the plurality of camera modules 130-1 to 130-N is selectively connected to the electronic device 100 through a wired interface. As another example, one or more camera modules among the plurality of camera modules 130-1 to 130-N are selectively connected with the electronic device 100 through a wireless interface such as Bluetooth and WLAN.

In the aforementioned embodiment of the present invention, the processor 120 executes software constituent elements stored in the program storage module 112 within one module and discriminately gives an editing effect to images displayed on the display module 160.

Figure 2:
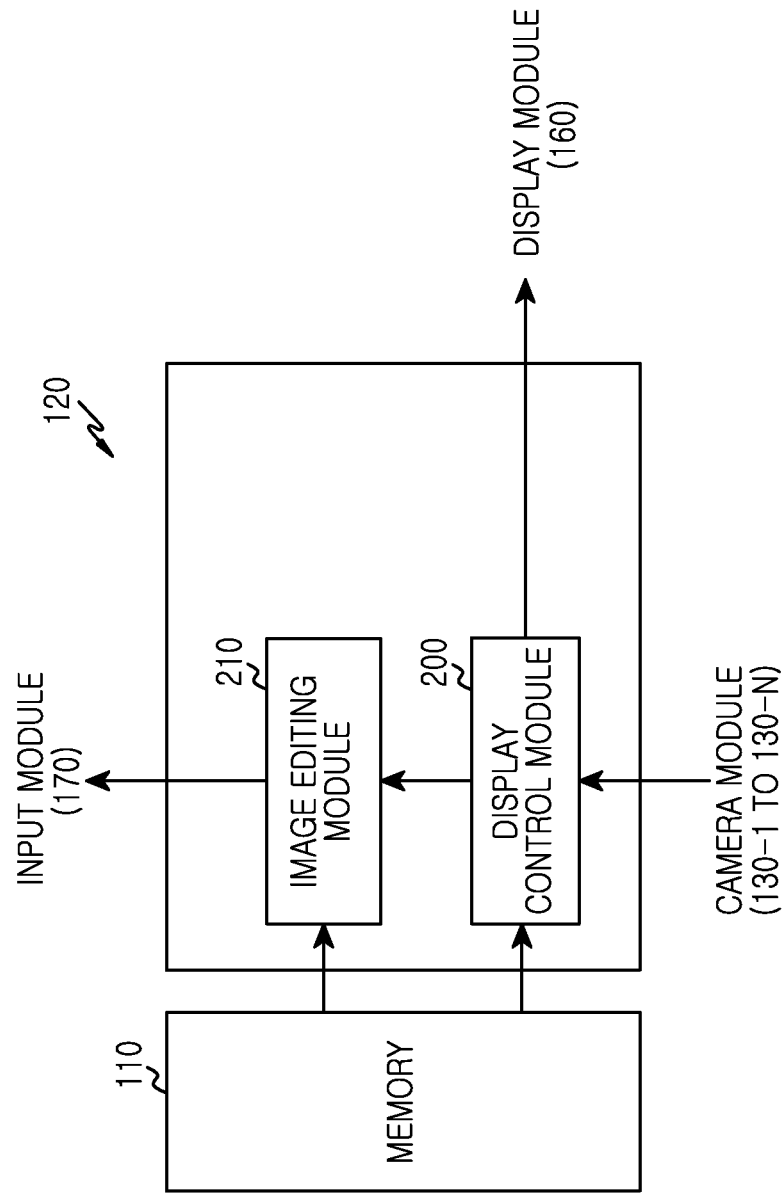
FIG. 2 is a block diagram illustrating a configuration of a processor in accordance with an embodiment of the present invention.

In another embodiment of the present invention, the processor 120 can be constructed to include as separate modules constituent elements for discriminately giving an editing effect to images displayed on the display module 160 as illustrated in FIG. 2 described below.

FIG. 2 is a block diagram illustrating a configuration of a processor in accordance with an embodiment of the present invention.

As illustrated in FIG. 2, the processor 120 includes a display control module 200 and an image editing module 210.

The display control module 200 executes the GUI program 113 stored in the program storage module 112 and provides a graphical user interface to the display module 160. At this time, the display control module 200 controls to display on the display module 160 information of an application program driven by the processor 120. For example, the display control module 200 controls to display on the display module 160 one or more images acquired through the camera modules 130-1 to 130-N. In detail, when a 1st camera module 130-1 is included in a rear part of the electronic device 100 and a 2nd camera module 130-2 is included in a front part thereof, as illustrated in FIG. 5A, the display control module 200 controls to overlap a 1st image 500 acquired through the 1st camera module 130-1 and a 2nd image 510 acquired through the 2nd camera module 130-2 and display the overlapping result on the display module 160. Here, the image overlapped and displayed on the display module 160 includes a preview image or a captured image.

The image editing module 210 executes the editing program 114 stored in the program storage module 112 and edits images displayed on the display module 160. At this time, the image editing module 210 extracts an editing variable corresponding to input information provided from the input module 170 from an editing control table stored in the data storage module 111 and discriminately gives an editing effect to the images displayed on the display module 160.

For example, as illustrated in FIGS. 5B and 5C, the image editing module 210 adjusts a transparency for at least one image among images displayed on the display module 160 in accordance with input information provided from the input module 170.

As another example, as illustrated in FIGS. 12A and 12B, the image editing module 210 discriminately adjusts a transparency for images displayed on the display module 160 in accordance with input information provided from the input module 170. In detail, when increasing a transparency of a 1st image 1200 in accordance with input information provided from the input module 170 as illustrated in FIG. 12A, the image editing module 210 decreases a transparency of a 2nd image 1210 in proportion to the adjustment amount of the transparency of the 1st image 1200. On the other hand, when increasing the transparency of the 2nd image 1210 in accordance with input information provided from the input module 170 as illustrated in FIG. 12B, the image editing module 210 decreases the transparency of the 1st image 1200 in proportion to the adjustment amount of the transparency of the 2nd image 1210.

As yet another example, as illustrated in FIGS. 6A and 6B, the image editing module 210 adjusts a contrast for at least one image among images displayed on the display module 160 in accordance with input information provided from the input module 170.

As yet another example, as illustrated in FIGS. 13A and 13B, the image editing module 210 discriminately adjusts a contrast for images displayed on the display module 160 in accordance with input information provided from the input module 170. In detail, when increasing a contrast ratio of a 1st image 1300 in accordance with input information provided from the input module 170 as illustrated in FIG. 13A, the image editing module 210 decreases a contrast ratio of a 2nd image 1310 in proportion to the adjustment amount of a contrast of the 1st image 1300. On the other hand, when increasing the contrast ratio of the 2nd image 1310 in accordance with input information provided from the input module 170 as illustrated in FIG. 13B, the image editing module 210 decreases the contrast ratio of the 1st image 1300 in proportion to the adjustment amount of a contrast of the 2nd image 1310.

As yet another example, as illustrated in FIGS. 7A and 7B, the image editing module 210 discriminately gives a gradient effect to at least one image among images displayed on the display module 160 in accordance with input information provided from the input module 170.

As yet another example, as illustrated in FIGS. 8A and 8B, the image editing module 210 discriminately gives a distortion effect to at least one image among images displayed on the display module 160 in accordance with input information provided from the input module 170.

As yet another example, as illustrated in FIGS. 9A and 9B, the image editing module 210 discriminately gives a charcoal effect to at least one image among images displayed on the display module 160 in accordance with input information provided from the input module 170.

In the aforementioned embodiment of the present invention, at a time the processor 120 synthesizes images for displaying on the display module 160, the electronic device 100 discriminately gives an editing effect to each image.

In another embodiment of the present invention, the electronic device 100 may be constructed to apply different camera setting variables to the respective camera modules 130-1 to 130-N so as to discriminately give an editing effect to images acquired through the respective camera modules 130-1 to 130-N. Here, the camera setting variable includes one or more of an exposure time, a gain of a camera sensor, and the number of imaging frames.

In yet another embodiment of the present invention, the electronic device 100 may be constructed to differently set a tuning variable of an image signal processor for processing images acquired through the respective camera modules 130-1 to 130-N so as to discriminately give an editing effect to the images acquired through the respective camera modules 130-1 to 130-N. Here, the tuning variable includes one or more of Automatic Exposure (AE), AutoFocus (AF), Automatic White Balance (AWB), and color.

Figure 3:
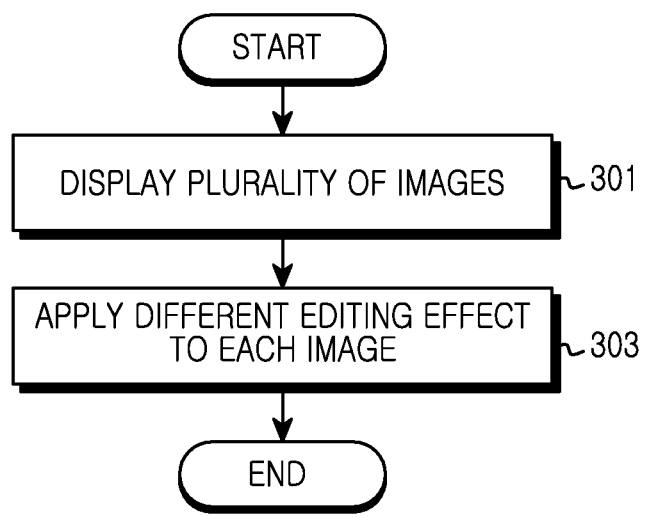
FIG. 3 is a flowchart illustrating a procedure for discriminately giving an image attribute to a plurality of images in accordance with an embodiment of the present invention.

FIG. 3 illustrates a procedure for discriminately giving an image attribute to a plurality of images in accordance with an embodiment of the present invention.

Referring to FIG. 3, in step 301, the electronic device displays a plurality of images on the display module 160. For example, as illustrated in FIG. 5A, the electronic device overlaps images 500 and 510 acquired through the camera modules 130-1 to 130-N and displays the overlapping result on the display module 160 That is, the electronic device displays the 1st image 500 in a 1st region among a display region of the display module 160 and displays the 2nd image 510 in a 2nd region.

In step 303, the electronic device applies a different editing effect to each of the images displayed on the display module 160. At this time, the electronic device extracts an editing variable corresponding to input information provided from the input module 170 from an editing control table stored in the data storage module 111 and discriminately gives an editing effect to the images displayed on the display module 160. That is, the electronic device discriminately applies the editing effect to a plurality of regions displaying different images in the display module 160.

For example, as illustrated in FIGS. 5B and 5C, the electronic device adjusts a transparency for at least one image among images displayed on the display module 160 in accordance with input information provided from the input module 170.

As another example, as illustrated in FIGS. 12A and 12B, the electronic device discriminately adjusts a transparency for images displayed on the display module 160 in accordance with input information provided from the input module 170. In detail, when increasing a transparency of a 1st image 1200 in accordance with input information provided from the input module 170 as illustrated in FIG. 12A, the electronic device decreases a transparency of a 2nd image 1210 in proportion to the adjustment amount of the transparency of the 1st image 1200. On the other hand, when increasing the transparency of the 2nd image 1210 in accordance with input information provided from the input module 170 as illustrated in FIG. 12B, the electronic device decreases the transparency of the 1st image 1200 in proportion to the adjustment amount of the transparency of the 2nd image 1210.

As yet another example, as illustrated in FIGS. 6A and 6B, the electronic device adjusts a contrast for at least one image among images displayed on the display module 160 in accordance with input information provided from the input module 170.

As yet another example, as illustrated in FIGS. 13A and 13B, the electronic device discriminately adjusts a contrast for images displayed on the display module 160 in accordance with input information provided from the input module 170. In detail, when increasing a contrast ratio of a 1st image 1300 in accordance with input information provided from the input module 170 as illustrated in FIG. 13A, the electronic device decreases a contrast ratio of a 2nd image 1310 in proportion to the adjustment amount of a contrast of the 1st image 1300. On the other hand, when increasing the contrast ratio of the 2nd image 1310 in accordance with input information provided from the input module 170 as illustrated in FIG. 13B, the electronic device decreases the contrast ratio of the 1st image 1300 in proportion to the adjustment amount of a contrast of the 2nd image 1310.

As yet another example, as illustrated in FIGS. 7A and 7B, the electronic device discriminately gives a gradient effect to at least one image among images displayed on the display module 160 in accordance with input information provided from the input module 170.

As yet another example, as illustrated in FIGS. 8A and 8B, the electronic device discriminately gives a distortion effect to at least one image among images displayed on the display module 160 in accordance with input information provided from the input module 170.

As yet another example, as illustrated in FIGS. 9A and 9B, the electronic device discriminately gives a charcoal effect to at least one image among images displayed on the display module 160 in accordance with input information provided from the input module 170.

As described above, the electronic device highlights a specific image by discriminately giving an editing effect to images displayed on the display module 160.

Figure 4:
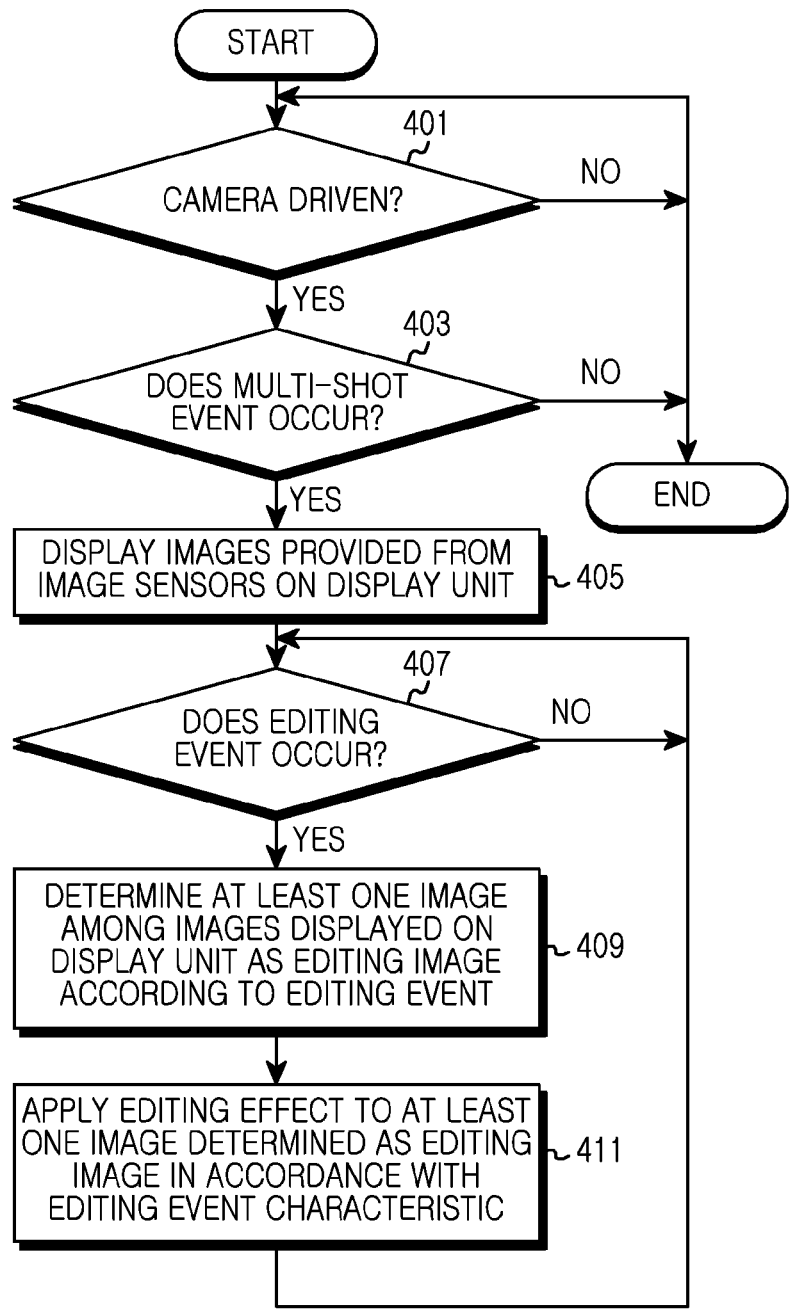
FIG. 4 is a flowchart illustrating a procedure for discriminately giving an editing effect to a plurality of images in accordance with a first embodiment of the present invention.

FIG. 4 illustrates a procedure for discriminately giving an editing effect to a plurality of images in accordance with a first embodiment of the present invention. The following description is made for a procedure for discriminately giving an editing effect with reference to screens illustrated in FIGS. 5A to 5C.

Referring to FIG. 4, in step 401, the electronic device determines if a camera has been driven. For example, the electronic device determines if an application program for driving the camera modules 130-1 to 130-N is executed in accordance with input information provided through the input module 170.

If the camera has not been driven, the electronic device terminates the procedure.

If the camera has been driven, in step 403, the electronic device determines if a multi-shot event takes place. For example, the electronic device determines if a camera photographing mode has been set as a multi-shot mode. As another example, the electronic device determines if the multi-shot mode is selected in accordance with input information provided through the input module 170. Here, the multi-shot mode represents a photographing mode of merging images acquired through the camera modules 130-1 to 130-N in the electronic device 100 to one image and displaying the merged image on the display module 160.

If the multi-shot event does not occur, the electronic device terminates the procedure.

If the multi-shot event occurs, in step 405, the electronic device displays on the display module 160 a plurality of images. For example, as illustrated in FIG. 5A, the electronic device 100 overlaps images 500 and 510 acquired through the camera modules 130-1 to 130-N and displays the overlapping result on the display module 160. That is, the electronic device 100 displays the 1st image 500 in a 1st region among a display region of the display module 160 and displays the 2nd image 510 in a 2nd region.

In step 407, the electronic device determines if an editing event occurs. For example, the electronic device determines if an editing menu is selected in accordance with input information provided through the input module 170. As another example, the electronic device determines if a touch to an editing bar 520 illustrated in FIG. 5A is sensed.

If the editing event occurs, in step 409, the electronic device determines, as an editing image for giving an editing effect according to the editing event, at least one image among the images displayed on the display module 160. For example, when sensing a touch-and-move from the center 522 of the editing bar 520 as illustrated in FIG. 5A to the right 524 of the editing bar 520 as illustrated in FIG. 5B, the electronic device determines the 1st image 500 as the editing image. As another example, when sensing a touch-and-move from the center 522 of the editing bar 520 as illustrated in FIG. 5A to the left 526 of the editing bar 520 as illustrated in FIG. 5C, the electronic device determines the 2nd image 510 as the editing image.

If at least one image is determined as the editing image, in step 411, the electronic device applies an editing effect to the at least one image among the images displayed on the display module 160 in accordance with an editing event characteristic. At this time, the electronic device extracts an editing variable corresponding to input information provided from the input module 170 from an editing control table stored in the data storage module 111 and discriminately gives the editing effect to the images displayed on the display module 160. That is, the electronic device discriminately applies the editing effect to a region displaying the editing image among a plurality of regions displaying different images in the display module 160. For example, when sensing a touch-and-move from the center 522 of the editing bar 520 as illustrated in FIG. 5A to the right 524 of the editing bar 520 as illustrated in FIG. 5B, the electronic device adjusts a transparency of the 1st image 500 by considering the direction and the length of a touch-and-move on the editing bar 520. As another example, when sensing a touch-and-move from the center 522 of the editing bar 520 as illustrated in FIG. 5A to the left 526 of the editing bar 520 as illustrated in FIG. 5C, the electronic device adjusts a transparency of the 2nd image 510 by considering the direction and the length of a touch-and-move on the editing bar 520.

The electronic device then returns to step 407 to determine if the editing event occurs.

In the aforementioned embodiment of the present invention, the electronic device discriminately gives an editing effect to at least one image among images displayed on the display module 160 in accordance with a multi-shot event. That is, the electronic device discriminately gives the editing effect to at least one preview image among preview images acquired through the camera modules 130-1 to 130-N.

In another embodiment of the present invention, the electronic device discriminately gives an editing effect to at least one captured image among captured images displayed on the display module 160 in accordance with a multi-shot event. Here, the captured image includes one or more of a moving picture and a still picture.

As described above, the electronic device discriminately gives an editing effect to images displayed on the display module 160. At this time, the electronic device can discriminately give various editing effects illustrated in FIGS. 6A to 6B, 7A to 7B, 8A to 8B, 9A to 9B, and 10A to 10B as well as a transparency to the images illustrated in FIG. 5A to 5C.

FIGS. 6A and 6B illustrate screens for discriminately controlling a contrast for a plurality of images in accordance with the first embodiment of the present invention.

When sensing a touch-and-move from the center 622 of an editing bar 620 to the right 624 as illustrated in FIG. 6A, the electronic device adjusts a contrast ratio of a 2nd image 610 by considering the direction and the length of a touch-and-move on the editing bar 620.

When sensing a touch-and-move from the center 622 of the editing bar 620 to the left 626 as illustrated in FIG. 6B, the electronic device adjusts a contrast ratio of a 1st image 600 by considering the direction and the length of a touch-and-move on the editing bar 620.

FIGS. 7A and 7B illustrate screens for discriminately giving a gradient effect to a plurality of images in accordance with the first embodiment of the present invention.

When sensing a touch-and-move from the center 722 of an editing bar 720 to the right 724 as illustrated in FIG. 7A, the electronic device applies a gradient effect to a 1st image 700. At this time, the electronic device adjusts an application range of the gradient effect applied to the 1st image 700 by considering the direction and the length of a touch-and-move on the editing bar 720.

When sensing a touch-and-move from the center 722 of the editing bar 720 to the left 726 as illustrated in FIG. 7B, the electronic device applies a gradient effect to a 2nd image 710. At this time, the electronic device adjusts an application range of the gradient effect applied to the 2nd image 710 by considering the direction and the length of a touch-and-move on the editing bar 720.

FIGS. 8A and 8B illustrate screens for discriminately giving a distortion effect to a plurality of images in accordance with the first embodiment of the present invention.

When sensing a touch-and-move from the center 822 of an editing bar 820 to the right 824 as illustrated in FIG. 8A, the electronic device applies a distortion effect to a 2nd image 810. At this time, the electronic device adjusts a distortion intensity applied to the 2nd image 810 by considering the direction and the length of a touch-and-move on the editing bar 820.

When sensing a touch-and-move from the center 822 of the editing bar 820 to the left 826 as illustrated in FIG. 8B, the electronic device applies a distortion effect to a 1st image 800. At this time, the electronic device adjusts a distortion intensity applied to the 1st image 800 by considering the direction and the length of a touch-and-move on the editing bar 820.

FIGS. 9A and 9B illustrate screens for discriminately controlling a charcoal effect of a plurality of images in accordance with the first embodiment of the present invention.

When sensing a touch-and-move from the center 922 of an editing bar 920 to the right 924 as illustrated in FIG. 9A, the electronic device applies a charcoal effect to a 2nd image 910. At this time, the electronic device adjusts a density of charcoal applied to the 2nd image 910 by considering the direction and the length of a touch-and-move on the editing bar 920.

When sensing a touch-and-move from the center 922 of the editing bar 920 to the left 926 as illustrated in FIG. 9B, the electronic device applies a charcoal effect to a 1st image 900. At this time, the electronic device adjusts a density of charcoal applied to the 1st image 900 by considering the direction and the length of a touch-and-move on the editing bar 920.

Figure 10A:
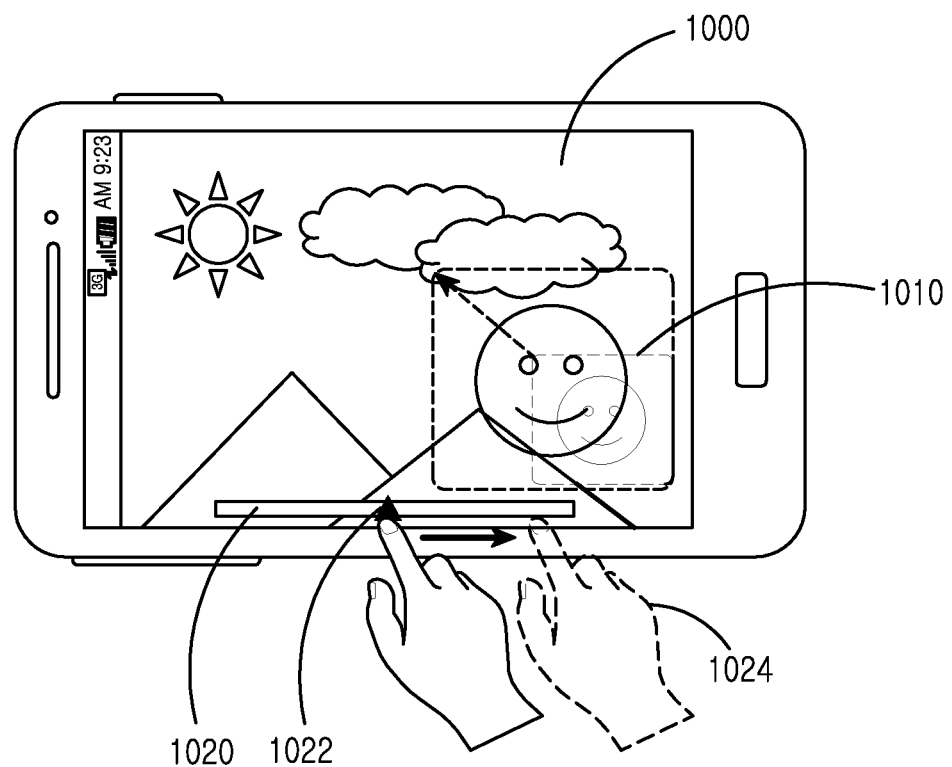
FIGS. 10A and 10B are diagrams illustrating screens for discriminately controlling a size for a plurality of images in accordance with the first embodiment of the present invention.
Figure 10B:
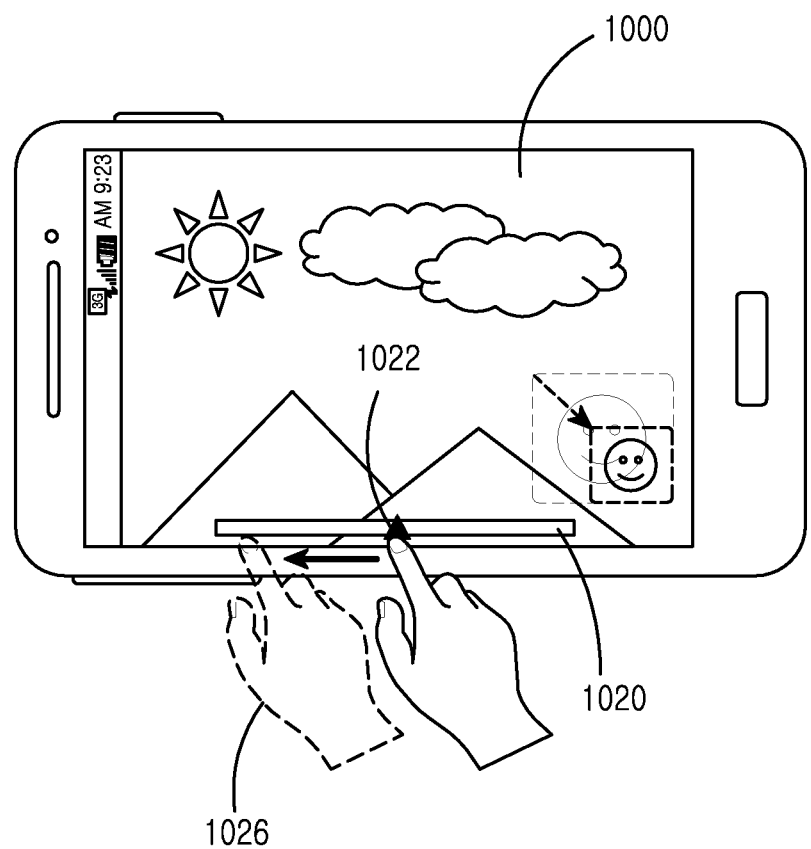

FIGS. 10A and 10B illustrate screens for discriminately controlling the size of a plurality of images in accordance with the first embodiment of the present invention.

When sensing a touch-and-move from the center 1022 of an editing bar 1020 to the right 1024 as illustrated in FIG. 10A, the electronic device adjusts a size of a 2nd image 1010 by considering the direction and the length of a touch-and-move on the editing bar 1020.

When sensing a touch-and-move from the center 1022 of the editing bar 1020 to the left 1026 as illustrated in FIG. 10B, the electronic device adjusts a size of a 1st image 1000 by considering the direction and the length of a touch-and-move on the editing bar 1020.

Figure 11:
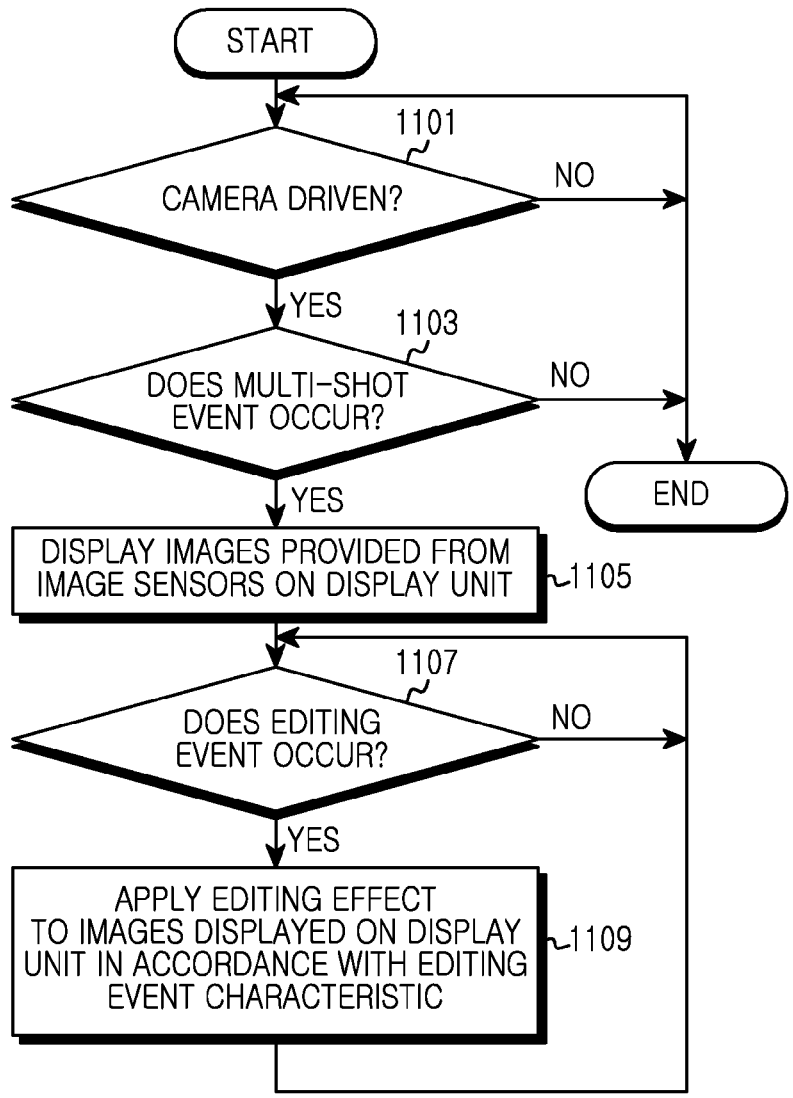
FIG. 11 is a flowchart illustrating a procedure for discriminately giving an editing effect to a plurality of images in accordance with a second embodiment of the present invention.

FIG. 11 illustrates a procedure for discriminately giving an editing effect to a plurality of images in accordance with a second embodiment of the present invention. The following description is made for a procedure for discriminately giving an editing effect with reference to screens illustrated in FIGS. 12A and 12B.

Referring to FIG. 11, in step 1101, the electronic device determines if a camera has been driven. For example, the electronic device determines if an application program for driving the camera modules 130-1 to 130-N is executed in accordance with input information provided through the input module 170.

If the camera has not been driven, the electronic device terminates the procedure.

On the other hand, if the camera has been driven, in step 1103, the electronic device determines if a multi-shot event takes place. For example, the electronic device determines if a camera photographing mode has been set as a multi-shot mode. As another example, the electronic device determines if the multi-shot mode is selected in accordance with input information provided through the input module 170. Here, the multi-shot mode represents a photographing mode of merging images acquired through the camera modules 130-1 to 130-N provided in the electronic device 100 into one image and displaying the merged image on the display module 160.

If the multi-shot event does not occur, the electronic device terminates the procedure.

If the multi-shot event occurs, in step 1105, the electronic device displays on the display module 160 a plurality of images. For example, as illustrated in FIG. 12A, the electronic device 100 overlaps images 1200 and 1210 acquired through the camera modules 130-1 to 130-N and displays the overlapping result on the display module 160. That is, the electronic device 100 can display the 1st image 1200 in a 1st region among a display region of the display module 160 and display the 2nd image 1210 in a 2nd region.

After that, in step 1107, the electronic device determines if an editing event occurs. For example, the electronic device determines if an editing menu is selected in accordance with input information provided through the input module 170. As another example, the electronic device determines if a touch to an editing bar 1220 illustrated in FIG. 12A is sensed.

If the editing event occurs, in step 1109, the electronic device discriminately gives an editing effect to the images displayed on the display module 160. That is, the electronic device discriminately applies the editing effect to a plurality of regions displaying different images in the display module 160. For example, when sensing a touch-and-move from the center 1222 of an editing bar 1220 to the right 1224 as illustrated in FIG. 12A, the electronic device increases a transparency of a 1st image 1200 by considering the length of a touch-and-move on the editing bar 1220. At this time, the electronic device decreases a transparency of a 2nd image 1210 in proportion to an adjustment quantity of the transparency of the 1st image 1200. As another example, when sensing a touch-and-move from the center 1222 of the editing bar 1220 to the left 1226 as illustrated in FIG. 12B, the electronic device increases a transparency of the 2nd image 1210 in consideration of a touch-and-move distance of the editing bar 1220. At this time, the electronic device decreases a transparency of the 1st image 1200 in proportion to an adjustment quantity of the transparency of the 2nd image 1210. Here, the electronic device may apply an editing effect inverting the editing effect applied to the at least one image, to a remnant image other than the at least one image among the plurality of images.

The electronic device then returns to step 1107 to determine if the editing event occurs.

In the aforementioned embodiment of the present invention, the electronic device discriminately gives an editing effect to images displayed on the display module 160 in accordance with a multi-shot event. That is, the electronic device discriminately gives the editing effect to preview images acquired through the camera modules 130-1 to 130-N.

In another embodiment of the present invention, the electronic device discriminately gives an editing effect to captured images displayed on the display module 160 in accordance with a multi-shot event. Here, the captured image includes one or more of a moving picture and a still picture.

As described above, the electronic device discriminately gives an editing effect to images displayed on the display module 160. At this time, the electronic device can discriminately give various editing effects as well as a transparency to the images illustrated in FIGS. 12A and 12B. For example, the electronic device discriminately adjusts a contrast of the images displayed on the display module 160 as illustrated in FIGS. 13A and 13B.

FIGS. 13A and 13B illustrate screens for discriminately controlling a contrast for a plurality of images in accordance with a second embodiment of the present invention.

When sensing a touch-and-move from the center 1322 of an editing bar 1320 to the right 1324 as illustrated in FIG. 13A, the electronic device decreases a contrast ratio of a 2nd image 1310 by considering the length of a touch-and-move on the editing bar 1320. At this time, the electronic device increases a contrast ratio of a 1st image 1300 in proportion to an adjustment quantity of the contrast ratio of the 2nd image 1310. As another example, when sensing a touch-and-move from the center 1322 of the editing bar 1320 to the left 1326 as illustrated in FIG. 13B, the electronic device decreases a contrast ratio of the 1st image 1300 by considering the length of a touch-and-move on the editing bar 1320. At this time, the electronic device increases a contrast ratio of the 2nd image 1310 in proportion to an adjustment quantity of the contrast ratio of the 1st image 1300.

In the aforementioned embodiments of the present invention, the electronic device gives an editing effect to at least one image among a plurality of images displayed on the display module 160 as illustrated in FIG. 4, or discriminately gives the editing effect to the plurality of images displayed on the display module 160 as illustrated in FIG. 11. At this time, the electronic device may selectively use a 1st editing method of FIG. 4 and a 2nd editing method of FIG. 11 in accordance with menu setting.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), and the one or more programs comprise instructions, which when executed by one or more processors in an electronic device, cause the electronic device to perform a method of the present invention.

Any such software may be stored in the form of volatile or non-volatile storage, such as, for example, a storage device like a ROM, whether erasable or rewritable or neither, or in the form of a memory, such as, for example, a RAM, memory chip, a device or an integrated circuit or on an optically or magnetically readable medium, such as, for example, a Compact Disc (CD), a Digital Video Disc (DVD), a magnetic disk, a magnetic tape, or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing an apparatus or a method as claimed in any one of the claims of the invention and a machine-readable storage storing such a program. Further, such programs may be conveyed electronically via any medium such as a communication signal carried over a wired or wireless connection and embodiments suitably encompass the same.

According to various embodiments of the present invention, the electronic device discriminately gives an editing effect to a plurality of images which are taken using a plurality of image sensors, thereby being capable of adjusting a state of a screen from an image easily being distorted against a photographer's intention due to external environmental factors such as the direction of light, an angle of capturing, and the like, to an image format desired by a photographer with a simple operation.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
    displaying, on a display module, a plurality of preview images acquired through a plurality of image sensors, respectively;
    when sensing a touch input on an editing bar displayed on the display module, applying a first editing effect corresponding to the touch input to a first preview image among the plurality of preview images; and
    applying a second editing effect inverting the first editing effect corresponding to the touch input, to a second preview image among the plurality of preview images.

2. The method of claim 1, wherein displaying on the display module comprises displaying the plurality of preview images acquired through the plurality of image sensors in different display layers of the display module, and displaying to overlap the plurality of preview images.

3. The method of claim 1, wherein the first editing effect or the second editing effect comprises at least one of a transparency adjustment, a contrast adjustment, a gradient effect, a distortion effect, a charcoal effect, and a size adjustment.

4. The method of claim 1, wherein applying the first editing effect comprises changing, in accordance with the first editing effect, a camera setting variable of at least one image sensor acquiring the first preview image among the plurality of image sensors,
    wherein the camera setting variable comprises at least one of an exposure time, a gain of a camera sensor, and a number of imaging frames.

5. The method of claim 1, wherein applying the first editing effect comprises changing, in accordance with the first editing effect, a tuning variable of at least one image sensor acquiring the first preview image among the plurality of image sensors,
    wherein the tuning variable comprises a variable for at least one of Automatic Exposure (AE), AutoFocus (AF), Automatic White Balance (AWB), and color.

6. An electronic device comprising:
    a plurality of image sensors;
    a display module; and
    a processor configured to:
        control the display module to display a plurality of preview images acquired through the plurality of image sensors, respectively,
        when sensing a touch input on an editing bar displayed on the display module, apply a first editing effect corresponding to the touch input to a first preview image among the plurality of preview images, and
        apply a second editing effect inverting the first editing effect corresponding to the touch input, to a second preview image among the plurality of preview images.

7. The device of claim 6, wherein the display module is configured to display the plurality of preview images acquired through the plurality of image sensors in different display layers, and to display to overlap the preview images.

8. The device of claim 6, wherein the first editing effect or the second editing effect comprises at least one of a transparency adjustment, a contrast adjustment, a gradient effect, a distortion effect, a charcoal effect, and a size adjustment.

9. The device of claim 6, wherein the processor is configured to change, in accordance with the first editing effect, a camera setting variable of at least one image sensor acquiring the first preview image among the plurality of image sensors,
    wherein the camera setting variable comprises at least one of an exposure time, a gain of a camera sensor, and a number of imaging frames.

10. The device of claim 6, wherein the processor is configured to change, in accordance with the first editing effect, a tuning variable of at least one image sensor acquiring the first preview image among the plurality of image sensors,
    wherein the tuning variable comprises a variable for at least one of Automatic Exposure (AE), AutoFocus (AF), Automatic White Balance (AWB), and color.

* * * * *